(12) United States Patent
Wang et al.

(10) Patent No.: US 11,336,558 B2
(45) Date of Patent: May 17, 2022

(54) MESSAGE TRANSMISSION METHODS AND APPARATUSES

(71) Applicant: ALIPAY (HANGZHOU) INFORMATION TECHNOLOGY CO., LTD., Zhejiang (CN)

(72) Inventors: Jiang Wang, Hangzhou (CN); Chao Zeng, Hangzhou (CN); He Sun, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,877

(22) Filed: Jun. 29, 2021

(65) Prior Publication Data

US 2021/0328908 A1 Oct. 21, 2021

(30) Foreign Application Priority Data

Sep. 25, 2020 (CN) .......................... 202011019933.7

(51) Int. Cl.
*H04L 12/721* (2013.01)
*H04L 12/741* (2013.01)
(Continued)

(52) U.S. Cl.
CPC ............ *H04L 45/12* (2013.01); *H04L 45/745* (2013.01)

(58) Field of Classification Search
CPC combination set(s) only.
See application file for complete search history.

(56) References Cited

U.S. PATENT DOCUMENTS 10,417,217 B2 9/2019 Pierce et al.
10,757,084 B1 8/2020 Yu
(Continued)

FOREIGN PATENT DOCUMENTS

CN 1599350 3/2005
CN 102769889 11/2012
(Continued)

OTHER PUBLICATIONS bitcoinfibre.org [online], "Fibre," available no later than Jul. 2016, retrieved on Aug. 24, 2021, retrieved from URL<https://bitcoinfibre.org/>, 4 pages.
(Continued)

*Primary Examiner* — Xavier S Wong
(74) *Attorney, Agent, or Firm* — Fish & Richardson P.C.

(57) ABSTRACT

One or more embodiments of this specification provide a message transmission methods and apparatuses. A method includes: registering each of a plurality of blockchain nodes in a blockchain relay communication network to a blockchain node set indicated in a registration request submitted by a corresponding blockchain node of the plurality of blockchain nodes; generating a routing policy corresponding to each of the plurality of blockchain nodes, the routing policy comprising the blockchain node set that comprises the plurality of blockchain nodes and a relay node that connects to the corresponding blockchain node of the plurality of blockchain nodes; and receiving a first blockchain message sent for a target blockchain node in a target blockchain node set from one of the plurality of blockchain nodes.

20 Claims, 8 Drawing Sheets

(51) Int. Cl.
*H04L 45/12* (2022.01)
*H04L 45/745* (2022.01)

(56) References Cited

U.S. PATENT DOCUMENTS

| | | | |
|---|---|---|---|
| 2014/0022902 | A1 | 1/2014 | Uppunda et al. |
| 2017/0352027 | A1 | 12/2017 | Zhang et al. |
| 2018/0146035 | A1* | 5/2018 | Williams .............. H04L 9/0643 |
| 2018/0212970 | A1 | 7/2018 | Chen et al. |
| 2019/0082007 | A1 | 3/2019 | Klarman et al. |
| 2019/0342422 | A1* | 11/2019 | Li ..................... H04L 29/08171 |
| 2020/0013118 | A1* | 1/2020 | Treat .................... G06Q 20/383 |
| 2020/0034395 | A1* | 1/2020 | Lu ......................... H04L 9/3239 |
| 2020/0119925 | A1* | 4/2020 | Wang .................... H04L 9/3297 |
| 2020/0177572 | A1 | 6/2020 | Qui |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 107231299 | 10/2017 |
| CN | 107800795 | 3/2018 |
| CN | 107846718 | 3/2018 |
| CN | 108829749 | 11/2018 |
| CN | 109039847 | 12/2018 |
| CN | 109635165 | 4/2019 |
| CN | 109639550 | 4/2019 |
| CN | 109784881 | 5/2019 |
| CN | 109996306 | 7/2019 |
| CN | 110445882 | 11/2019 |
| CN | 110474846 | 11/2019 |
| CN | 110602201 | 12/2019 |
| CN | 110650189 | 1/2020 |
| CN | 110730449 | 1/2020 |
| CN | 110737664 | 1/2020 |
| CN | 110741400 | 1/2020 |
| CN | 110751475 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111522833 | 8/2020 |
| KR | 20180129028 | 12/2018 |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21182217.6, dated Dec. 1, 2021, 10 pages.

* cited by examiner

302 — Respectively register, according to a registration request submitted by each blockchain node, the blockchain node to a blockchain node set indicated by the registration request, so as to respectively generate a routing policy corresponding to each blockchain node, wherein the routing policy comprises a blockchain node set to which the corresponding blockchain node pertains and a connected relay node 304 — Query, when receiving a first blockchain message sent for a target blockchain node in a target blockchain node set from a connected blockchain node, information of the blockchain node connected to the first relay node, a primary routing table and a secondary routing table until target relay nodes that all target blockchain nodes are connected to have been determined 306 — Transmit the first blockchain message to the target blockchain node through the target relay node

FIG. 3

MESSAGE TRANSMISSION METHODS AND APPARATUSES

CROSS-REFERENCE TO RELATED APPLICATIONS

This application claims priority to Chinese Patent Application No. 202011019933.7, filed on Sep. 25, 2020, which is hereby incorporated by reference in its entirety.

TECHNICAL FIELD

One or more embodiments of this specification relate to the field of blockchain technology, and in particular, to message transmission methods and apparatuses.

BACKGROUND

The blockchain technology (also referred to as the distributed ledger technology) is a decentralized distributed database technology, featured by being decentralized, open, transparent, immutable, trustworthy, and the like, and is suitable for many application scenarios with high needs on data reliability.

SUMMARY

In view of this, one or more embodiments of this specification provide message transmission methods and apparatuses.

To achieve the previously described objective, one or more embodiments of this specification provide the following technical solutions.

According to a first aspect of one or more embodiments of this specification, a message transmission method applied to a first relay node in a blockchain relay communication network is provided. The method includes:

respectively registering, based on a registration request submitted by each blockchain node, the blockchain node to a blockchain node set indicated by the registration request, so as to respectively generate a routing policy corresponding to each blockchain node, where the routing policy includes a blockchain node set to which the corresponding blockchain node pertains and a connected relay node;

querying, when receiving a first blockchain message sent for a target blockchain node in a target blockchain node set from a connected blockchain node, information of the blockchain node connected to the first relay node, a primary routing table and a secondary routing table, until target relay nodes that all target blockchain nodes are connected to have been determined, where the primary routing table is configured to record routing policies corresponding to blockchain nodes respectively connected to all relay nodes in a relay node set to which the first relay node pertains, and the secondary routing table is configured to record routing policies corresponding to blockchain nodes respectively connected to all relay nodes in the blockchain relay communication network, or routing policies corresponding to blockchain nodes respectively connected to remaining relay nodes in the blockchain relay communication network not added to the relay node set; and transmitting the first blockchain message to the target blockchain node through the target relay node.

According to a second aspect of the one or more embodiments of this specification, a message transmission apparatus applied to a first relay node in a blockchain relay communication network is provided. The apparatus includes:

a registration unit, configured to register, based on a registration request submitted by each blockchain node, the blockchain node to a blockchain node set indicated by the registration request, so as to respectively generate a routing policy corresponding to each blockchain node, where the routing policy includes a blockchain node set to which the corresponding blockchain node pertains and a connected relay node;

a determining unit, configured to query, when receiving a first blockchain message sent for a target blockchain node in a target blockchain node set from a connected blockchain node, information of the blockchain node connected to the first relay node, a primary routing table and a secondary routing table, until target relay nodes that all target blockchain nodes are connected to have been determined, where the primary routing table is configured to record routing policies corresponding to blockchain nodes respectively connected to all relay nodes in a relay node set to which the first relay node pertains, and the secondary routing table is configured to record routing policies corresponding to blockchain nodes respectively connected to all relay nodes in the blockchain relay communication network, or routing policies corresponding to blockchain nodes respectively connected to remaining relay nodes in the blockchain relay communication network not joining the relay node set; and a transmission unit, configured to transmit the first blockchain message to the target blockchain node through the target relay node.

According to a third aspect of the one or more embodiments of this specification, an electronic device is provided, including:

a processor; and a memory, configured to store processor executable instructions, where the processor executes the executable instructions to implement the method according to the first aspect.

According to a fourth aspect of the one or more embodiments of this specification, a computer-readable storage medium is provided to store computer instructions, where the instructions are executed by a processor to implement steps of the method in the first aspect.

BRIEF DESCRIPTION OF THE DRAWINGS

FIG. 3 is a flowchart of a message transmission method, according to an explanatory embodiment.

DESCRIPTION OF EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are instead only examples of apparatuses and methods that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
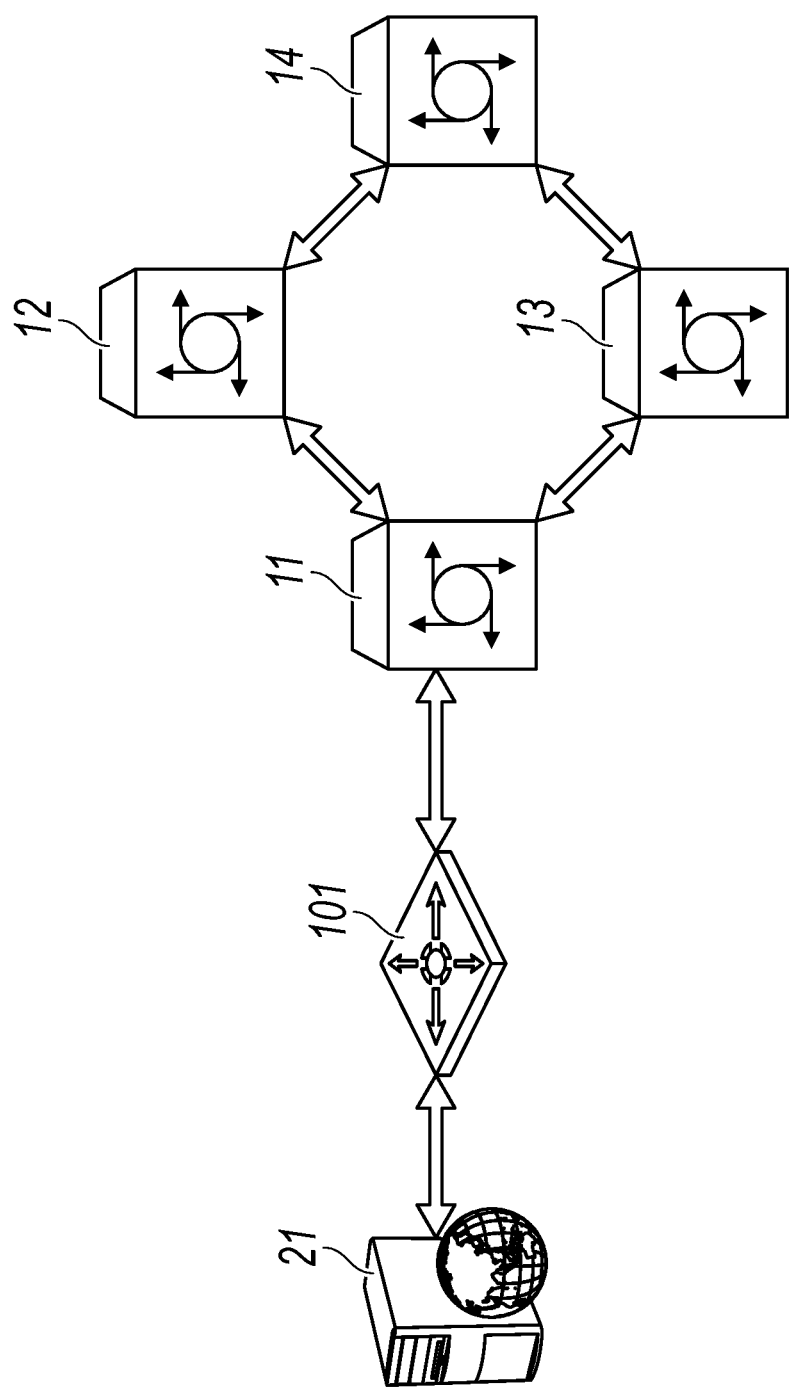
FIG. 1 is a schematic diagram showing interaction between a blockchain node and a blockchain relay communication network, according to an explanatory embodiment.

FIG. 1 is a schematic diagram showing interaction between a blockchain node and a blockchain relay communication network, according to an explanatory embodiment. As shown in FIG. 1, it is assumed that a blockchain relay communication network includes a plurality of relay nodes such as a relay 11, a relay 12, a relay 13, and a relay 14. Taking the relay 11 as an example, the relay 11 can be connected to a node 21 in a blockchain network through a gateway 101. Similarly, another relay node can also be connected to another blockchain node in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can communicate with the gateway 101 through a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or another device independent of the relay 11 and the node 21, and is not limited in this specification.

The blockchain network includes a plurality of blockchain nodes, and communication operations such as consensus, transaction transmission, and block synchronization need to be implemented among the blockchain nodes. In the related art, a peer-to-peer (P2P) technology is directly used for communication between the blockchain nodes to transmit transactions, blocks, or the like, but due to various network factors, a communication delay is high and a stability is poor, which cannot meet application needs. Therefore, similar to the node 21, each blockchain node can access the relay node in the blockchain relay communication network respectively. In this way, the blockchain nodes can communicate with each other through the blockchain relay communication network. As the blockchain relay communication network is a backbone relay communication network facing real-time transmission of blockchains, the relay nodes can communicate and interact with each other through a high quality bandwidth guaranteed by high QoS. Therefore, the blockchain relay communication network takes over an intermediate link of communication between the blockchain nodes, which can reduce the communication delay and improve the stability, thus significantly improving a communication quality between the blockchain nodes.

The blockchain relay communication network can be applied to various types of blockchain networks, including a public chain, a private chain, a consortium chain, or the like. For example, the blockchain relay communication networks applied to the public chains mainly include Falcon, Fast Bitcoin Relay Network (FBRN), Fast Internet Bitcoin Relay Engine (FIBRE), or the like, and the blockchain relay communication networks applied to the consortium chains mainly include BloXRoute, Blockchain Transmission Network (BTN), or the like. However, the blockchain relay communication networks in the related art can only play a relay role in the communication process between the blockchain nodes, and have no essential difference from a P2P transmission mechanism adopted when no blockchain relay communication network is used.

Figure 2:
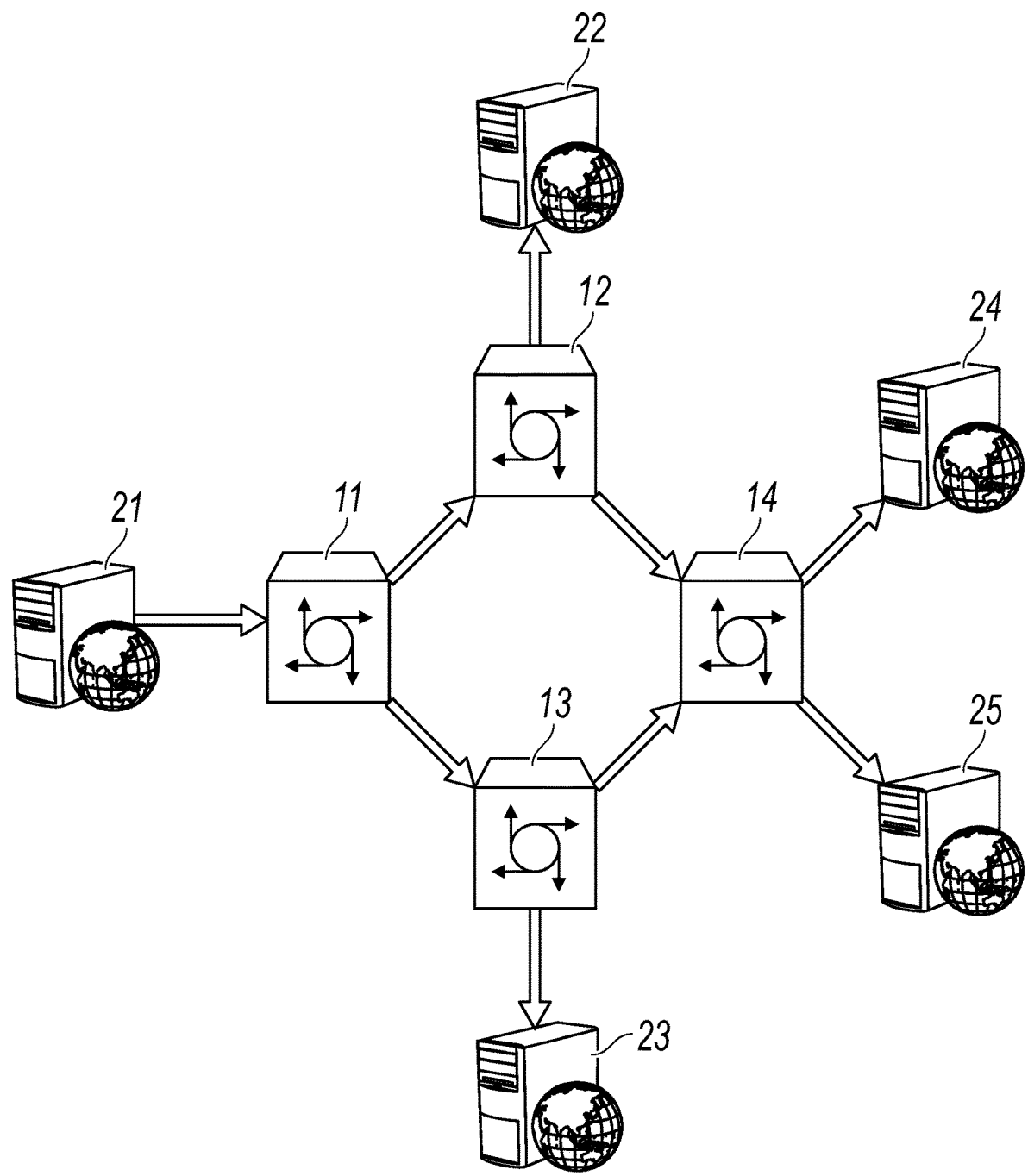
FIG. 2 is a schematic diagram of a message transmission scenario, according to an explanatory embodiment.

Take a message transmission scenario shown in FIG. 2 as an example. It is assumed that the node 21 in the blockchain network is connected to the relay 11 in the blockchain relay communication network, a node 22 is connected to the relay 12, a node 23 is connected to the relay 13, and nodes 24 to 25 are connected to the relay 14. To facilitate understanding, the previously mentioned gateway (such as the gateway 101) is omitted herein. When the node 21 needs to send a message to the node 22 and the node 24, the node 21 first sends the message to the relay 11, and the relay 11 forwards the message to the relay 12 and the relay 13 separately. The relay 12 forwards the message to the node 22 on one hand and forwards the message to the relay 14 on the other hand. The relay 13 forwards the message to the node 23 on one hand and forwards the message to the relay 14 on the other hand. The relay 14 forwards the message to the node 24 and the node 25. Consequently, the message from the node 21 is received by the node 22 and the node 24, and also received by the node 23 and the node 25. Moreover, the operation of forwarding the message to node 25 by the relay 14, the operation of forwarding the message to the relay 13 by the relay 11, and the operation of separately forwarding the message to the relay 14 and the node 23 by the relay 13 are not necessary. These operations cause waste of communication resources.

To save the communication resources and realize a more efficient communication process through the blockchain relay communication network, this specification provides a new message transmission solution.

FIG. 3 is a flowchart of a message transmission method, according to an explanatory embodiment. As shown in FIG. 3, the method is applied to a relay node in a blockchain relay communication network. The method can include the following steps.

At step 302, based on a registration request submitted by each blockchain node, the blockchain node is registered to a blockchain node set indicated by the registration request, so as to respectively generate a routing policy corresponding to the blockchain node, where the routing policy includes a blockchain node set to which the corresponding blockchain node pertains and a connected relay node.

The blockchain relay communication network can be layered on a control plane and a data plane, and a forwarding control policy of network data can be separated from the data transmission process, so that the forwarding control policy can be freely defined, and the data transmission can be more universal and efficient. For the blockchain relay communication network, the control plane can be understood as a message routing policy, and the data plane refers to transmission of a blockchain message in the blockchain relay communication network. By submitting the registration request, the blockchain node can freely configure a blockchain node set to which blockchain node pertains based on application (or service) needs, so as to adjust a message routing related to the blockchain node.

Through the previously described methods, the transmission process of the blockchain message in the blockchain relay communication network is optimized. Still taking the nodes 21 to 25 as an example, it is assumed that the node 21 wants to send a blockchain message to the node 22 and the node 24. If the node 22 and the node 24 are added to the same blockchain node set by sending registration requests in advance, the node 21 only needs to mark a target object of the blockchain message as the blockchain node set, to ensure that the blockchain relay communication network only sends the blockchain message to the node 22 and the node 24 that pertain to the blockchain node set. For example, the node 21 sends the blockchain message to the relay 11, the relay 11 forwards the blockchain message to the relay 12, the relay 12 forwards the blockchain message to the node 22 and the relay 14 separately, and the relay 14 forwards the blockchain message to the node 24, thus avoiding sending the blockchain message to other relay nodes and blockchain nodes, to alleviate waste of the communication resources. The transmission process of the blockchain message in the blockchain relay communication network is described in detail below.

If the registration request includes a set identifier, the relay node can register the blockchain node initiating the registration request to a blockchain node set corresponding to the set identifier. If the blockchain node set corresponding to the set identifier is created in advance, the blockchain node is added to the blockchain node set; if the blockchain node set corresponding to the set identifier is not created in advance, the blockchain node set is created and the blockchain node is added to the blockchain node set.

If the registration request does not include a set identifier, the relay node can register the blockchain node initiating the registration request to a default blockchain node set. The default blockchain node set can include all blockchain nodes in the blockchain network to which the blockchain node initiating the registration request pertains; or, the default blockchain node set can be another predefined blockchain node set, depending on a predefined policy adopted by the blockchain relay communication network.

In a case of not considering the blockchain node set to which the blockchain node is added, a corresponding routing policy of the blockchain node in the blockchain relay communication network only involves a node ID of the blockchain node and a relay ID of a relay node connected to the blockchain node. For example, a routing policy corresponding to the node 21 in FIG. 2 is "node 21-relay 11", and a routing policy corresponding to the node 22 is "node 22-relay 12", or the like. In a case of considering the blockchain node set to which the blockchain node is added, information related to the blockchain node set is added to the routing policy corresponding to the blockchain node in the blockchain relay communication network. For example, when the node 21 is added to a blockchain node set SID1, the routing policy corresponding to the node 21 can be updated from the "node 21-relay 11" to "SID1/node 21-relay 11", indicating that the node 21 pertains to the blockchain node set SID1.

The same blockchain node can be added to one or more blockchain node sets based on application needs. That is, blockchain nodes included in different blockchain node sets can overlap. For example, a blockchain node set C1 can include the node 21, the node 22, and the node 23, and a blockchain node set C2 can include the node 21, the node 22, the node 23, the node 24, and the node 25, so the node 22 and the node 23 pertain to the two blockchain node sets C1 and C2 at the same time. When the same blockchain node is respectively added to a plurality of blockchain node sets, a plurality of routing policies will be generated accordingly. For example, the node 21 mentioned above can be respectively added to a blockchain node set SID1 and a blockchain node set SID2. At this time, the node 21 can have two corresponding routing policies, which are "SID1/node 21-relay 11" corresponding to the blockchain node set SID1 and "SID2/node 21-relay 11" corresponding to the blockchain node set SID2.

At step 304, when receiving a first blockchain message sent for a target blockchain node in a target blockchain node set from a connected blockchain node, information of the blockchain node connected to the first relay node, a primary routing table and a secondary routing table are sequentially queried, until target relay nodes that all target blockchain nodes are connected to have been determined.

The relay node can receive the blockchain message sent for the target blockchain node in the target blockchain node set from the connected blockchain node, and transmit the blockchain message according to the technical solutions of this specification. For example, the relay node forwards the blockchain message to the target relay node only, but not to another relay node. Certainly, the relay node can also receive the blockchain message for the target blockchain node set from another relay node in the blockchain relay communication network. In this case, the relay node may be one of the target relay nodes, or the relay node may not be the target relay node, but is needed to forward the blockchain message to the target relay node. For example, in the embodiment shown in FIG. 2, it is assumed that the node 21 wants to send the blockchain message to a target blockchain node set, and a member of the target blockchain node set is the node 24: the relay 11 first receives the blockchain message from the node 21, and determines that the target relay node is the relay 14 connected to the node 24, and a route forwarding path between the relay 11 and the relay 14 is "relay 11-relay 12-relay 14", so the relay 11 transmits the blockchain message to the relay 12. After receiving the blockchain message, the relay 12 finds that the target relay node is the relay 14, so the relay 12 forwards the blockchain message to the relay 14. After receiving the blockchain message, the relay 14 finds that the target relay node is the relay 14 and the target blockchain node is the node 24, so the relay 14 forwards the blockchain message to the node 24.

In the embodiment shown in FIG. 2, a number of the blockchain nodes and a number of the relay nodes are both limited, and the relay nodes 11 to 14 can maintain a full-quantity routing table. The full-quantity routing table includes all the routing policies corresponding to each blockchain node, and the relay nodes 11 to 14 can quickly determine the target blockchain node and the target relay node connected to the relay nodes 11 to 14 through the full-quantity routing table. However, if there are a large number of routing policies, it may take a long time for the relay node to forward the blockchain message only through the full-quantity routing table, which results in a low efficiency of forwarding the blockchain message.

Figure 4:
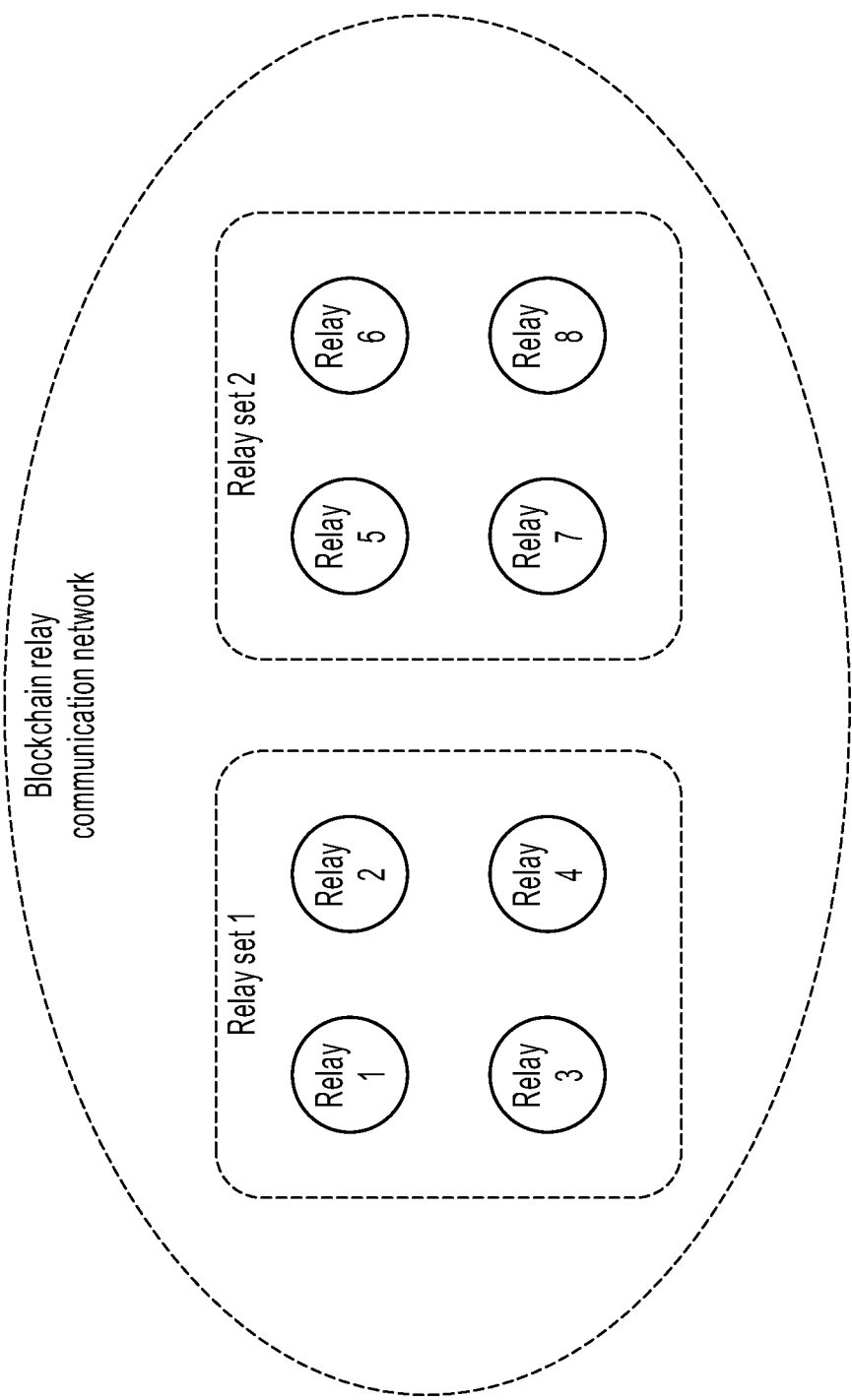
FIG. 4 and FIG. 5 are schematic diagrams of partitioning for relay nodes, according to an explanatory embodiment.
Figure 5:
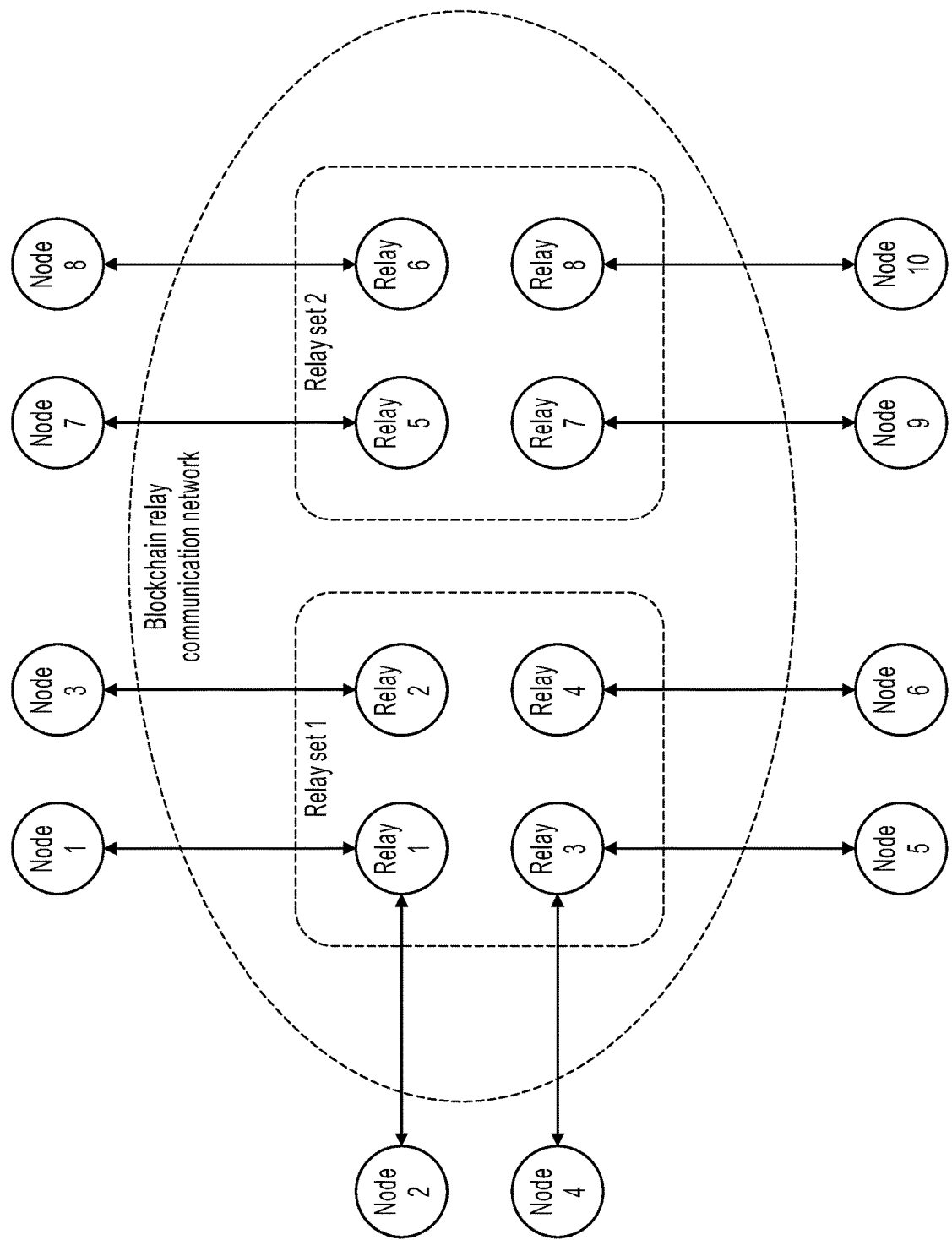

Therefore, this specification proposes a design solution of two hierarchies of routing tables. The relay nodes in the blockchain relay communication network can be partitioned into a plurality of relay node sets. Each relay node set includes one or more relay nodes, and each relay node only pertains to one relay node set. For example, in the embodiment shown in FIG. 4, for eight relay nodes respectively relay 1 to relay 8, the relay 1 to the relay 4 can be classified into a relay set 1 and the relay 5 to the relay 8 are classified into a relay set 2. Certainly, a relay node set to which each relay node pertains and a number of relay nodes included in each relay node set can be set based on actual needs, and are not limited in this specification. For example, relay nodes deployed at the same place or at similar deployment positions can be classified into the same relay node set. A corresponding primary routing table can be created for each relay node set. The primary routing table is configured to record routing policies corresponding to blockchain nodes connected to all relay nodes in the relay node set, but does not include routing policies corresponding to blockchain nodes connected to relay nodes in another relay node set. Taking FIG. 5 as an example, the node 1 to the node 6 are connected to the relay 1 to the relay 4 in the relay set 1, and the node 7 to the node 10 are connected to the relay 5 to the relay 8 in the relay set 2. Therefore, a primary routing table corresponding to the relay set 1 only includes the routing policies corresponding to the node 1 to the node 6, but does not include the routing policies corresponding to the node 7 to the node 10, while a primary routing table corresponding to the relay set 2 only includes the routing policies corresponding to the node 7 to the node 10, but does not include the routing policies corresponding to the node 1 to the node 6.

Each relay node not only can maintain the corresponding primary routing table according to the relay node set in which the relay node is located, but also can maintain a secondary routing table. The secondary routing table can be the full-quantity routing table mentioned above, which is configured to record the routing policies corresponding to the blockchain nodes respectively connected to all the relay nodes. In this case, all the relay nodes maintain the same secondary routing table. For example, in the embodiment shown in FIG. 5, the secondary routing table can include the routing policies respectively corresponding to the node 1 to the node 10. Alternatively, the secondary routing table can exclude the routing policies contained in the primary routing table based on the full-quantity routing table mentioned above. In this case, the relay nodes in the same relay node set maintain the same secondary routing table, the relay nodes in different relay node sets maintain different secondary routing tables, and the full-quantity routing table mentioned above can be combined by the primary routing table and the secondary routing table maintained by each relay node. Taking FIG. 5 for example, the secondary routing table maintained by the relay 1 to the relay 4 can include the routing policies respectively corresponding to the node 7 to the node 10, and the secondary routing table maintained by the relay 5 to the relay 8 can include the routing policies respectively corresponding to the node 1 to the node 6.

Therefore, combining the primary routing table and the secondary routing table, the corresponding primary routing table for the first relay node in the step 304 is configured to record the routing policies corresponding to the blockchain nodes respectively connected to all the relay nodes in the relay node set to which the first relay node pertains, and the secondary routing table is configured to record the routing policies corresponding to the blockchain nodes connected to all the relay nodes in the blockchain relay communication network or the routing policies corresponding to the blockchain nodes respectively connected to the remaining relay nodes in the blockchain relay communication network but not added to the relay node set (which is the relay node set to which the first relay node pertains).

The first relay node sequentially queries, when receiving the first blockchain message sent from the connected blockchain node, the information of the blockchain node connected to the first relay node, a first routing table and a second routing table until the target relay nodes that all the target blockchain nodes are connected to have been determined. The information of the blockchain node connected to the first relay node can be the routing policies corresponding to these blockchain nodes, or the first relay node can also maintain the information of these blockchain nodes in another way.

In the querying process, if the first relay node cannot determine whether all the target relay nodes are queried, the first relay node needs to sequentially traverse the information of the blockchain node connected to the first relay node, the first routing table and the second routing table, and take all the matched relay nodes queried as the target relay nodes mentioned above. Taking FIG. 5 for example, it is assumed that the first relay node is the relay 1, the relay 1 receives the first blockchain message mentioned above from the node 1, and the target blockchain nodes of the first blockchain message are the node 2, the node 3, the node 7 and the node 8. The first blockchain message can include a set identifier of the target blockchain node set. For example, the set identifier is SID1, while the node 2, the node 3, the node 7 and the node 8 are registered to the blockchain node set SID1 in advance. For another example, the set identifier can be CID1/SID1, that is, the target blockchain node set is a subset SID1 included in the blockchain node set CID1, while the node 2, the node 3, the node 7 and the node 8 are registered to the subset SID1 in advance. The first blockchain message can also include a node identifier of the target blockchain node. For example, node identifiers corresponding to the node 2, the node 3, the node 7 and the node 8 mentioned above can respectively be Node2, Node3, Node7 and Node8. It can be seen that when a number of the target blockchain nodes is large, compared with the node identifier, the set identifier can express the same information with relatively less contents (indicating which blockchain nodes are target blockchain nodes), thus reducing a data volume of the first blockchain message and improving a transmission efficiency of the first blockchain message. Accordingly, for the received first blockchain message, a processing procedure carried out by the relay 1 includes the following.

First, the relay 1 queries information of a blockchain node connected to the relay 1, and can query that the node 2 is the target blockchain node and determine that the relay 1 is the target relay node, so the relay 1 can directly forward the first blockchain message to the node 2.

Next, the relay 1 continues to query the first routing table which records the routing policies of the node 1 to the node 6, so that the relay 1 can query that the node 3 is the target blockchain node and determine that the relay 2 connected to the node 3 pertains to the target relay node, then the relay 1 can forward the first blockchain message to the relay 2, so that the relay 2 can forward the first blockchain message to the node 3.

Finally, the relay 1 continues to query the second routing table which at least records the routing policies of the node 7 to the node 10, so that the relay 1 can query that the node 7 and the node 8 are the target blockchain nodes and determine that the relay 5 and the relay 6 respectively connected to the node 7 and the node 8 pertain to the target relay nodes, then the relay 1 can forward the first blockchain message to the relay 5 and the relay 6, so that the relay 5 and the relay 6 can forward the first blockchain message to the node 7 and the node 8.

It can be seen that when any relay node receives any blockchain message from the blockchain nodes connected to the any relay node or another relay node, if the relay node is the target relay node, the relay node can directly transmit the received blockchain message to the target blockchain node connected to the relay node. For example, the relay 1 mentioned above forwards the first blockchain message to the node 2. Regardless of whether the relay node is the target relay node or not, if the relay node determines that a target relay node different from the relay node exists, the relay node can transmit the received blockchain message to the target relay node for the target relay node to forward the blockchain message to the connected target blockchain node. For example, the relay 1 mentioned above forwards the first blockchain message to the relay 2, the relay 5 and the relay 6.

Taking the first relay node for example, when the first relay node wants to forward the first blockchain message to a certain target relay node different from the first relay node, the first relay node can directly transmit the first blockchain message to the target relay node. For example, the relay 1 mentioned above can directly forward the first blockchain message to the node 2, the node 5 and the node 6.

In addition to direct forwarding, the first relay node can adopt different forwarding methods for different target relay nodes based on the relay sets in which the first relay node and the target relay nodes are located. For each relay node set formed in the blockchain relay communication network, relay nodes respectively pertaining to a host node or a slave node can be determined in each relay node set by pre-configuration or election, where the host node is configured to implement cross-set communication and the slave node only implements intra-set communication. Therefore, when the target relay node and the first relay node are not in the same relay node set, the first relay node can send the received blockchain message to a host node in the relay node set to which the target relay node pertains for the host node to forward the blockchain message to the target relay node. Still taking FIG. 5 as an example, if the relay 1 is a host node, and the relay 2 to the relay 4 are slave nodes in the relay set 1, the relay 5 is a host node, and the relay 6 to the relay 8 are slave nodes in the relay set 2, after the relay 1 receives the first blockchain message from the node 1, for the relay 2 which is determined as the target relay node, because the relay 2 is the slave node in the relay set 1, the relay 1 directly forwards the first blockchain message to the relay 2. For the relay 5 and the relay 6 which are determined as the target relay nodes, because the relay 5 and the relay 6 pertain to the relay set 2 which is different from the relay set 1 to which the relay 1 pertains, the relay 1 forwards the first blockchain message to the host node (which happens to be the relay 5) of the relay set 2, for the host node to further forward the first blockchain message to the target relay node in the relay set 2.

It can be seen that whether the first relay node is the host node in the relay node set to which the first relay node pertains affects a processing mode of the first relay node after receiving the blockchain message.

When the first relay node is the host node in the relay node set to which the first relay node pertains, and the first relay node receives the second blockchain message sent for the target blockchain node in the target blockchain node set from a second relay node in another relay node set, the first relay node needs to sequentially query the information of the blockchain node connected to the first relay node and the primary routing table until all the target relay nodes connected to the target blockchain node in the relay node set to which the first relay node pertains are determined, for the target relay node to transmit the second blockchain message to the target relay node. Still taking FIG. 5 as an example, it is assumed that the relay 5 is the first relay node. The relay 5 serves as the host node of the relay set 2, and after receiving the blockchain message forwarded by the relay 2, the relay 5 needs to sequentially query the information of the blockchain nodes connected to the relay 5 and the primary routing table. If the node 7 and the node 8 serve as the target blockchain nodes, the relay 5 can determine the relay 5 and the relay 6 as the target relay nodes respectively, so that the relay 5 forwards the blockchain messages to the node 7 on one hand, and the relay 5 forwards the blockchain messages to the relay 6 on the other hand, for the relay 6 to forward the blockchain message to the node 8. In this scenario, because the relay 5 receives the blockchain message from another relay node set, the relay 5 only needs to pay attention to the target relay node in the relay set 2 in which the relay 5 is located, and does not need to pay attention to the target relay nodes in another relay node set. Therefore, it is not necessary to query the secondary routing table. For another relay node set, for example, when another relay node sets such as a relay set 3 and a relay set 4 exist, if these relay node sets include the target relay node, the relay 2 will forward the blockchain message to host nodes in these relay node sets, which is similar to the process of the relay 2 for forwarding the blockchain message to the relay 5, and is not described in detail herein.

When the first relay node is a slave node in the relay node set to which the first relay node pertains, and the first relay node receives a third blockchain message sent for the target blockchain node in the target blockchain node set from the host node in the relay node set to which the first relay node pertains, the first relay node can determine the target blockchain node connected to the first relay node and forward the third blockchain message to the determined target blockchain node. Still taking FIG. 5 as an example, it is assumed that the relay 6 is the first relay node, and the relay 6 is the slave node in the relay set 2. When the relay 5 serving as the host node determines that the relay 6 is the target relay node, the relay 6 receives the blockchain message from the relay 5, and then the relay 6 determines whether there is a target blockchain node exists among the blockchain nodes connected to the relay 6. For example, the relay 6 can determine that the node 8 is the target blockchain node, so the relay 6 can forward the received blockchain message to the node 8. The relay 6 does not need to pay attention to whether another relay node in the relay set 2 is the target relay nodes, which is determined by the relay 5 serving as the host node by querying the primary routing table, so the relay 6 does not need to query the primary routing table. Certainly, the relay 6 does not need to pay attention to the target relay nodes in another relay node set, so it is also not necessary to query the secondary routing table.

In the querying process, if the first relay node can determine whether all the target relay nodes are already queried, for example, a total number of the target blockchain nodes is marked in the first blockchain message, then when a number of the queried target blockchain nodes reaches the total number, the first relay node can determine that the queried blockchain nodes are all the target blockchain nodes and the corresponding relay nodes are all the target relay nodes. In this case, the first relay node does not need to continue to query whether there are routing policies which are not queried yet. On the contrary, if the number of the queried target blockchain nodes is less than the total number mentioned above, the querying needs to be continued.

Therefore, the first relay node only needs to query the information of the blockchain node connected to the first relay node (or even just querying a part of the information only) without continuing to query the first routing table and the second routing table; or only needs to query the information of the blockchain node connected to the first relay node and the first routing table (possibly only querying a part of the first routing table) without continuing to query the second routing table; or only needs to sequentially query the information of the blockchain node connected to the first relay node, the primary routing table and the second routing table (possibly only querying a part of the second routing table).

The first relay node can also determine whether all the target relay nodes are queried by other ways. For example, when a blockchain node generates a blockchain message, a type field in the blockchain message can be configured: when the type field is a first value, it indicates that a target field included in the blockchain message is the set identifier of the target blockchain node set, and when the type field is a second value, it indicates that the target field included in the blockchain message is the node identifier of the target blockchain node. Since the blockchain node can be registered to or exited from the blockchain node set at any time, the first relay node cannot determine the information (node identifier, node number, or the like) of the target blockchain node when reading that a value of the type field is the first value, and needs to traverse all the routing policies. When reading that the value of the type field is the second value, the first relay node can directly read the node identifier of each target blockchain node, so the information (node identifier, node number, or the like) of the target blockchain node can be determined and configured to determine whether all the target relay nodes are already queried in the querying process.

Figure 6:
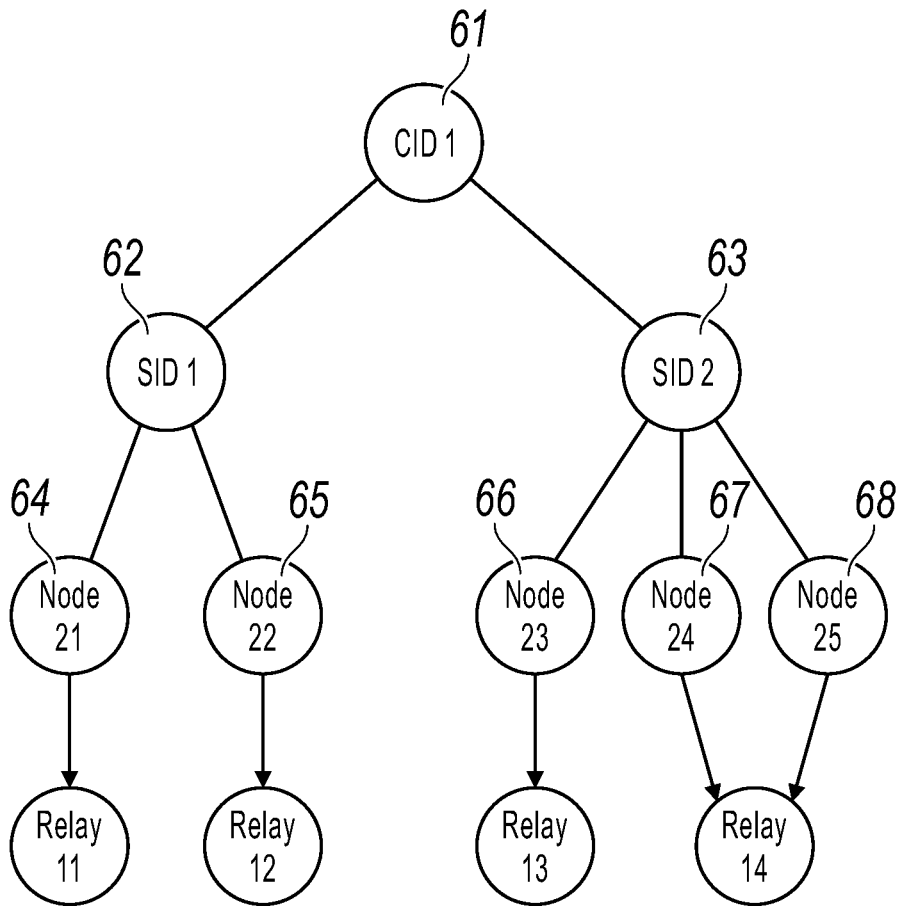
FIG. 6 is a schematic diagram of a tree-like routing table, according to an explanatory embodiment.

There can be a hierarchical relationship between the blockchain node sets. Based on the hierarchical relationship, the blockchain node set to which the blockchain node pertains, and the connection relationship between the blockchain node and the relay node, the routing policies corresponding to each blockchain node in the blockchain relay communication network can be formed into a tree-like structure, that is, a tree-like routing table. Both the primary routing table and the secondary routing table mentioned above can be organized in the form of tree-like routing table. Certainly, in actual use, it is possible that only the primary routing table employs the form of tree-like routing table, or only the secondary routing table employs the form of tree-like routing table, or both the primary routing table and the secondary routing table employ the form of tree-like routing table, which are not limited in this specification. For example, as shown in FIG. 6, it is assumed that the node 21 and the node 22 both pertain to the blockchain node set SID1, the node 23, the node 24, and the node 25 all pertain to a blockchain node set SID2, and the blockchain node set SID1 and the blockchain node set SID2 both pertain to a blockchain node set CID1 (therefore, the nodes 21 to 25 actually pertain to the blockchain node set CID1). Therefore, the blockchain node set CID1 corresponds to a root node 61 in the tree-like routing table, the blockchain node set SID1 and the blockchain node set SID2 respectively correspond to child nodes 62 to 63 of the root node 61 in the tree-like routing table, the node 21 and the node 22 respectively correspond to child nodes 64 to 65 of a node 62 in the tree-like routing table, the node 23, the node 24 and the node 25 respectively correspond to child nodes 66 to 68 of a node 63 in the tree-like routing table, and the nodes 64 to 68 are leaf nodes of the tree-like routing table. Moreover, values of these leaf nodes are relay IDs of connected relay nodes. For example, the node 21 is connected to the relay 11, so the value of the leaf node 64 is the relay 11, and so on.

Certainly, the tree-like routing table shown in FIG. 6 shows routing relationships in a logic level, and the relay node usually adopts other forms when actually recording the routing relationships. For example, for each blockchain node, the relay node can generate a routing policy corresponding to the blockchain node based on a path from the root node to the leaf node corresponding to the blockchain node, and separate adjacent nodes by a predefined separator, so the routing policy corresponding to the node 21 can be CID1/SID1/Node1:tn1, where Node1 is a node ID of the node 21 and tn1 is a relay ID of the relay 11. Similarly, the routing policy corresponding to the node 23 can be CID1/SID2/Node3:tn3, where Node3 is a node ID of the node 23, tn3 is a relay ID of the relay 13, and so on.

By describing the nodes on the whole path where the blockchain nodes are located in the routing policy, a set identifier of a low-hierarchy blockchain node set can be more flexible. For example, on the basis of the blockchain node sets SID1 and SID2, a next hierarchy of blockchain node sets are further included, such as a blockchain node set 1 pertaining to the blockchain node set SID1 and a blockchain node set 2 pertaining to the blockchain node set SID2, so even if the blockchain node set 1 and the blockchain node set 2 adopt the same set identifier, the two sets can still be distinguished by a difference between the blockchain node sets SID1 and SID2.

Figure 7:
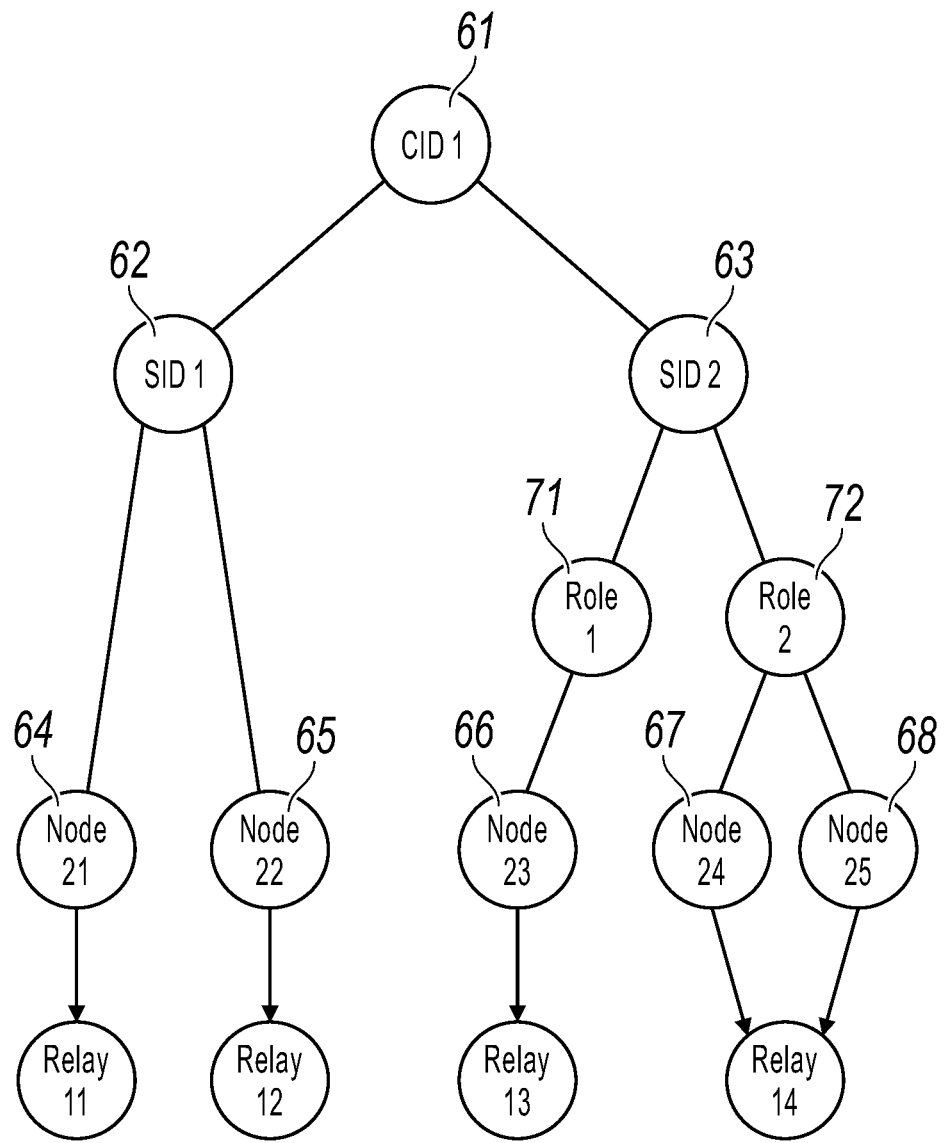
FIG. 7 is a schematic diagram of a tree-like routing table related to role types, according to an explanatory embodiment.

The blockchain node can indicate the target blockchain node set by adding a set identifier to the blockchain message. Correspondingly, after receiving the blockchain message, the relay node can read a set identifier from the blockchain message, and determine a blockchain node set corresponding to the set identifier as the target blockchain node set corresponding to the blockchain message. If the tree-like routing table mentioned above is adopted, the set identifier included in the blockchain message preferably includes information of all the blockchain node sets in the corresponding path of the target blockchain node. For example, for the node 21 in FIG. 7, the set identifier included in the blockchain message can be expressed as "CID1/SID1". In this way, even if there is other "CID2/SID1", the set identifier can be clearly distinguished. Certainly, the set identifier included in the blockchain message can alternatively include only the set identifier of the target blockchain node set as long as the set identifier of each blockchain node set at all hierarchies can be ensured to be unique. For example, the "CID1/SID1" is adjusted to "SID1".

In addition to classifying the blockchain nodes into each blockchain node set, the blockchain nodes included in the blockchain node set can be further classified to achieve finer-grained routing configuration and message transmission. For example, the blockchain nodes included in the blockchain node set can be classified into a plurality of role types, such as consensus nodes, ledger nodes, and other role types based on different functions implemented by the blockchain nodes, or different role types based on application needs or other dimensions, which is not limited in this specification. The registration request initiated by the blockchain node can include role type information, and the relay node can record a role type corresponding to each blockchain node in the blockchain node set, and record the role type of each blockchain node in the blockchain node set into a corresponding routing policy.

Accordingly, when the first relay node receives the first blockchain message from the connected blockchain node, if the first blockchain message includes the set identifier and the information of the target role type of the target blockchain node set, the first relay node can respectively query the blockchain nodes pertaining to the target blockchain node set (determined by the set identifier) and corresponding to the target role type in the information of the blockchain node connected to the first relay node, the primary routing table and the secondary routing table, determine the queried blockchain nodes as the target blockchain node, and determine the relay node connected to the queried blockchain node as the target relay node.

When the information of the role type is included in the routing policy, the routing table organized by the routing policy can change accordingly. Taking the tree-like routing table as an example, it is assumed that a role 1 and a role 2 are divided from the blockchain node set SID2, the tree-like routing table shown in FIG. 6 can be updated as that shown in FIG. 7: a new hierarchy can be added below the node 63 corresponding to the blockchain node set SID2, and the hierarchy includes a node 71 corresponding to the role 1 and a node 72 corresponding to the role 2. If the blockchain node 23 pertains to the role 1 and the blockchain nodes 67 to 68 pertain to the role 2, the node 66 corresponding to the blockchain node 23 can be used as a child node of the node 71, and the nodes 67 to 68 corresponding to the blockchain nodes 24 to 25 can be used as child nodes of the node 72. Moreover, the routing policy corresponding to the blockchain node 23 can be updated to CID1/SID2/Role1/Node3: tn3, where Role1 represents the role 1, Node3 is a node ID of the blockchain node 23, and tn3 is a relay ID of the relay 13. Similarly, the routing policy corresponding to the blockchain node 24 can be updated to CID1/SID2/Role2/Node4: tn4, where Role2 represents the role 2, Node4 is a node ID of the blockchain node 24, and tn4 is a relay ID of the relay 14.

At step 306, the first blockchain message is transmitted to the target blockchain node through the target relay node.

In conclusion, regardless of whether the blockchain node set or the specific blockchain node is indicated in the blockchain message, the technical solution of this specification can make the relay node in the blockchain relay communication network realize targeted message transmission in the process of transmitting the blockchain message, which aims to transmit the blockchain message to the target relay node and then transmit the blockchain message from the target relay node to the blockchain node serving as the target object, without generating unnecessary data interaction between the relay nodes or between the relay nodes and the blockchain nodes, thus eliminating a blindness of message transmission based on the P2P technology in the related art, accelerating a transmission speed of the blockchain message, and reducing resource consumption of the blockchain relay communication network.

Figure 8:
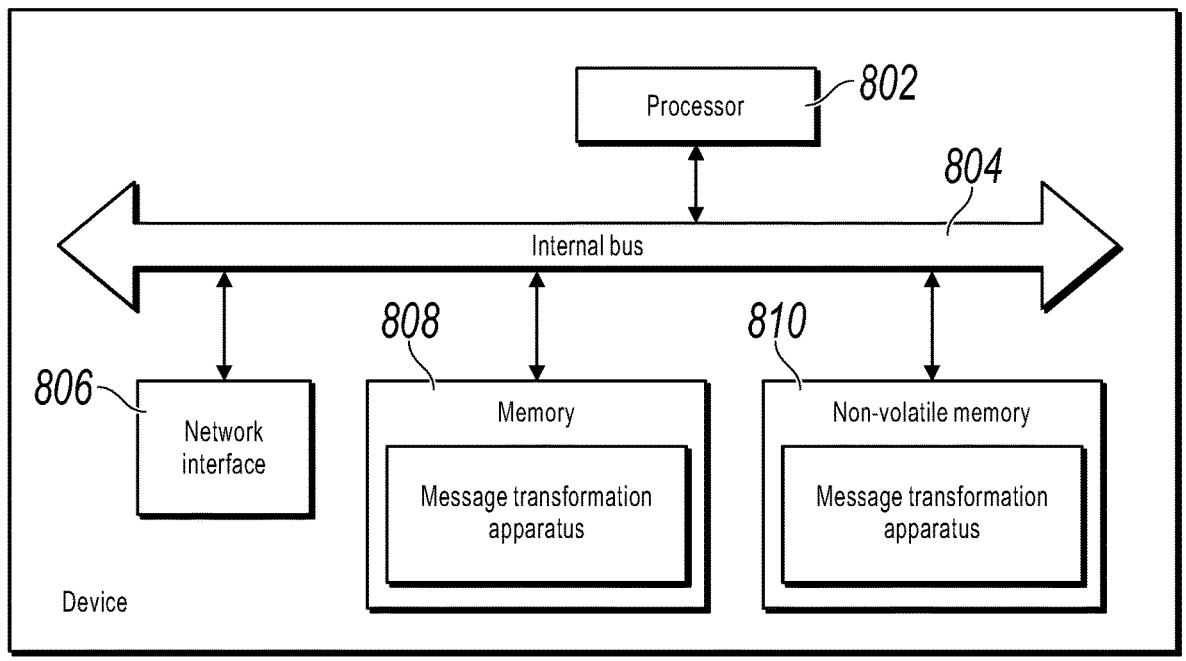
FIG. 8 is a schematic structural diagram of a device, according to an explanatory embodiment.

FIG. 8 is a schematic structural diagram of a device, according to an explanatory embodiment. Referring to FIG. 8, at a hardware level, the device includes a processor 802, an internal bus 804, a network interface 806, an internal memory 808, and a non-volatile memory 810, and certainly can further include hardware required for other services. The processor 802 reads a corresponding computer program from the non-volatile memory 810 into the internal memory 808 and then executes the computer program, to form a message transmission apparatus at a logic level. Certainly, in addition to a software implementation, one or more embodiments of this specification do not exclude other implementations, for example, logic devices or a software-hardware combination. That is, execution bodies of the following processing procedures are not limited to logic units and can alternatively be hardware or logic devices.

Figure 9:
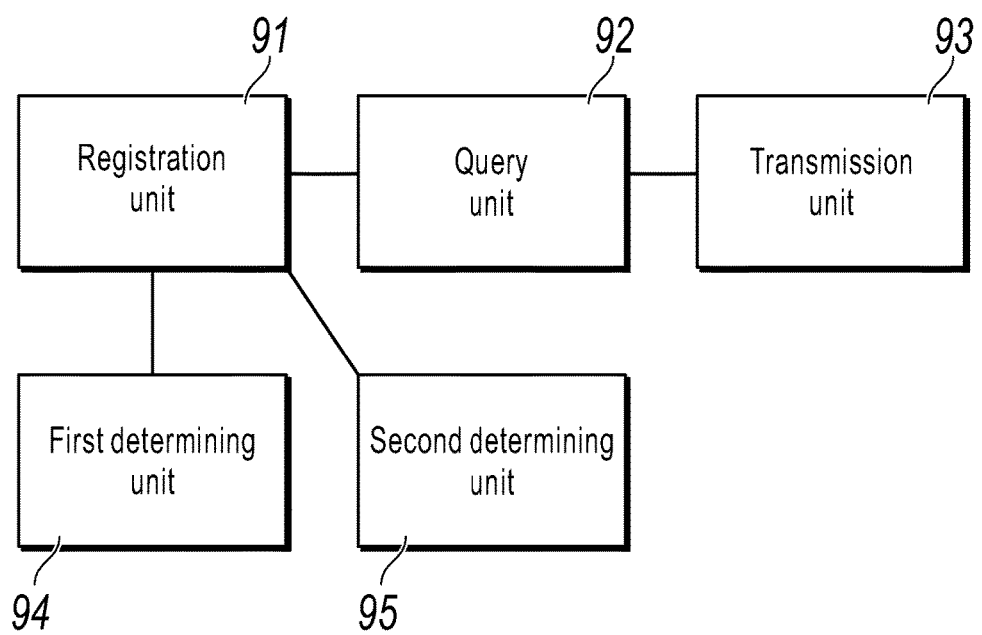
FIG. 9 is a block diagram of a message transmission apparatus, according to an explanatory embodiment.

With reference to FIG. 9, in a software embodiment, the message transmission apparatus is applied to a first relay node in a blockchain relay communication network, and can include:

a registration unit 91, configured to register, based on a registration request submitted by each blockchain node, the blockchain node to a blockchain node set indicated by the registration request, so as to respectively generate a routing policy corresponding to the blockchain node, where the routing policy includes a blockchain node set to which the corresponding blockchain node pertains and a connected relay node;

a query unit 92, configured to sequentially query, when receiving a first blockchain message sent for a target blockchain node in a target blockchain node set from a connected blockchain node, information of the blockchain node connected to the first relay node, a primary routing table and a secondary routing table, until target relay nodes that all target blockchain nodes are connected to have been determined, where the primary routing table is configured to record routing policies corresponding to blockchain nodes respectively connected to all relay nodes in a relay node set to which the first relay node pertains, and the secondary routing table is configured to record routing policies corresponding to blockchain nodes respectively connected to all relay nodes in the blockchain relay communication network or routing policies corresponding to blockchain nodes respectively connected to remaining relay nodes in the blockchain relay communication network but not joining the relay node set; and a transmission unit 93, configured to transmit the first blockchain message to the target blockchain node through the target relay node.

Optionally, the first blockchain message includes a set identifier of the target blockchain node set; and the query unit 92 is specifically configured to:

respectively query a blockchain node pertaining to the target blockchain node set in the information of the blockchain node connected to the first relay node, the primary routing table and the secondary routing table; and determine the queried blockchain node as the target blockchain node, and determine a relay node connected to the queried blockchain node as the target relay node.

Optionally, the first blockchain message includes a node identifier of the target blockchain node; and the query unit 92 is specifically configured to:

sequentially query the information of the blockchain node connected to the first relay node, the primary routing table and the secondary routing table respectively, until a blockchain node corresponding to the node identifier is queried; and determine the queried blockchain node as the target blockchain node, and determine a relay node connected to the queried blockchain node as the target relay node.

Optionally, the registration request includes role type information, and the routing policy further includes a role type corresponding to the corresponding blockchain node in the blockchain node set to which the blockchain node pertains; and the query unit 92 is specifically configured to:

respectively query, in a case that the first blockchain message includes the set identifier of the target blockchain node set, a blockchain node pertaining to the target blockchain node set and corresponding to a target role type indicated in the blockchain message in the information of the blockchain node connected to the first relay node, the primary routing table and the secondary routing table; and determine the queried blockchain node as the target blockchain node, and determine a relay node connected to the queried blockchain node as the target relay node.

Optionally, the apparatus further includes:

a first determining unit 94, configured to, sequentially query, when the first relay node is a host node in the relay node set to which the first relay node pertains and the first relay node receives a second blockchain message sent for the target blockchain node in the target blockchain node set from a second relay node in another relay node set, the information of the blockchain node connected to the first relay node and the primary routing table until target relay nodes respectively connected to all target blockchain nodes in the relay node set are determined, so as to transmit the second blockchain message to the target blockchain node through the target relay node; and a second determining unit 95, configured to determine, when the first relay node is a slave node in the relay node set to which the first relay node pertains and the first relay node receives a third blockchain message sent for the target blockchain node in the target blockchain node set from the host node in the relay node set to which the first relay node pertains, a target blockchain node connected to the first relay node, and forward the third blockchain message to the determined target blockchain node.

Optionally, the transmission unit 93 is specifically configured to:

transmit, when the first relay node is the target relay node, the any blockchain message to the target blockchain node connected to the first relay node; and/or, transmit, when a target relay node different from the first relay node exists, the any blockchain message to the target relay node for the target relay node to forward the any blockchain message to the connected target blockchain node.

Optionally, when the target relay node different from the first relay node exists, the transmission unit 93 is specifically configured to:

transmit, when the target relay node and the first relay node are in the same relay node set, the any blockchain message to the target relay node; and transmit, when the target relay node and the first relay node are not in the same relay node set, the any blockchain message to a host node in a relay node set to which the target relay node pertains for the host node to forward the any blockchain message to the target relay node.

Optionally, the registration unit 91 is specifically configured to:

register, in a case that the registration request includes a set identifier, the blockchain node initiating the registration request to a blockchain node set corresponding to the set identifier; and register, in a case that the registration request does not include a set identifier, the blockchain node initiating the registration request to a default blockchain node set.

The system, the apparatus, the module or the unit described in the previous embodiments can be implemented by a computer chip or an entity, or implemented by a product having a certain function. A typical implementation device is a computer. A form of the computer can be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium can be a non-volatile medium, a volatile medium, a removable medium and a non-removable medium, which can implement storage of information by using any method or technology. The information can be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media (transitory media), such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressed, or can include inherent elements of the process, method, product, or device. Without further limitation, the element defined by a phrase "includes" does not exclude other same elements in the process, method, product or device which include the element.

Embodiments of this specification are described above. Other embodiments fall within the scope of the appended claims. In some cases, the actions or steps described in the claims can be performed in sequences different from those in the embodiments, and an expected result can still be achieved. In addition, the processes depicted in the accompanying drawings are not necessarily performed in the specific order or successively to achieve an expected result. In some implementations, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previously described descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
   registering each of a plurality of blockchain nodes in a blockchain relay communication network to a blockchain node set indicated in a registration request submitted by a corresponding blockchain node of the plurality of blockchain nodes;
   generating a routing policy corresponding to each of the plurality of blockchain nodes, the routing policy comprising the blockchain node set that comprises the plurality of blockchain nodes and a relay node that connects to the corresponding blockchain node of the plurality of blockchain nodes;
   receiving a first blockchain message sent for a target blockchain node in a target blockchain node set from one of the plurality of blockchain nodes;
   determining information of a first blockchain node of the plurality of blockchain nodes connected to a first relay node, a primary routing table, and a secondary routing table, wherein the primary routing table is configured to record routing policies corresponding to the plurality of blockchain nodes connected to relay nodes in a relay node set that includes the first relay node, and the secondary routing table is configured to record one of (i) routing policies corresponding to the plurality of blockchain nodes connected to all relay nodes in the blockchain relay communication network or (ii) routing policies corresponding to the plurality of blockchain nodes connected to relay nodes in the blockchain relay communication network outside of the relay node set;
   determining whether the first relay node is a target relay node;
   in response to determining that the first relay node is the target relay node, transmitting the first blockchain message to the target blockchain node connected to the first relay node; and
   in response to identifying that the first relay node is different from the target relay node, transmitting the first blockchain message to the target relay node for the target relay node to forward the first blockchain message to the target blockchain node.

2. The computer-implemented method according to claim 1, wherein the first blockchain message comprises a set identifier of the target blockchain node set, and
   wherein determining the information of the first blockchain node, the primary routing table, and the secondary routing table, comprises:
      determining one of the plurality of blockchain nodes as the target blockchain node; and
      determining a relay node connected to the one of the plurality of blockchain nodes as the target relay node.

3. The computer-implemented method according to claim 1, wherein the first blockchain message comprises a node identifier of the target blockchain node, and
   wherein determining the information of the first blockchain node, the primary routing table, and the secondary routing table comprises:
      determining one of the plurality of blockchain nodes as the target blockchain node; and
      determining a relay node connected to the one of the plurality of blockchain nodes as the target relay node.

4. The computer-implemented method according to claim 1, wherein the registration request comprises role type information,
   wherein the routing policy corresponding to each of the plurality of blockchain nodes comprises a role type corresponding to each blockchain node in the blockchain node set,
   wherein determining information of the first blockchain node, the primary routing table, and the secondary routing table comprises:
      determining, in response to the first blockchain message comprising a set identifier of the target blockchain node set, a blockchain node comprised in the target blockchain node set and corresponding to a target role type indicated in the first blockchain message in the information of the first blockchain node, the primary routing table, and the secondary routing table;
      determining one of the plurality of blockchain nodes as the target blockchain node; and
      determining a relay node connected to the one of the plurality of blockchain nodes as the target relay node.

5. The computer-implemented method according to claim 1, comprising:
   receiving, by the first relay node in the relay node set from a second relay node in a different relay node set, a second blockchain message sent for the target blockchain node in the target blockchain node set;
   determining, from the information of the first blockchain node and the primary routing table, that the target blockchain node is connected to the first relay node; and
   forwarding, through the first relay node, the second blockchain message to the target blockchain node.

6. The computer-implemented method according to claim 1, wherein transmitting the first blockchain message to the target relay node comprises:
   transmitting, in response to determining that the target relay node and the first relay node are comprised in a same relay node set, the first blockchain message to the target relay node; and
   transmitting, in response to determining that the target relay node and the first relay node are comprised in different relay node set, the first blockchain message to a host node in a relay node set that comprises the target relay node for the host node to forward the first blockchain message to the target relay node.

7. The computer-implemented method according to claim 1, wherein registering each of the plurality of blockchain nodes in a blockchain relay communication network to a blockchain node set indicated in a registration request comprises:

registering, in response to determining that the registration request comprises a set identifier, the corresponding blockchain node submitting the registration request to a blockchain node set corresponding to the set identifier; or registering, in response to determining that the registration request is absent of a set identifier, the corresponding blockchain node submitting the registration request to a default blockchain node set.

8. A non-transitory, computer-readable medium storing one or more instructions executable by a computer system to perform operations comprising:

registering each of a plurality of blockchain nodes in a blockchain relay communication network to a blockchain node set indicated in a registration request submitted by a corresponding blockchain node of the plurality of blockchain nodes;

generating a routing policy corresponding to each of the plurality of blockchain nodes, the routing policy comprising the blockchain node set that comprises the plurality of blockchain nodes and a relay node that connects to the corresponding blockchain node of the plurality of blockchain nodes;

receiving a first blockchain message sent for a target blockchain node in a target blockchain node set from one of the plurality of blockchain nodes;

determining information of a first blockchain node of the plurality of blockchain nodes connected to a first relay node, a primary routing table, and a secondary routing table, wherein the primary routing table is configured to record routing policies corresponding to the plurality of blockchain nodes connected to relay nodes in a relay node set that includes the first relay node, and the secondary routing table is configured to record one of (i) routing policies corresponding to the plurality of blockchain nodes connected to all relay nodes in the blockchain relay communication network or (ii) routing policies corresponding to the plurality of blockchain nodes connected to relay nodes in the blockchain relay communication network outside of the relay node set;

determining whether the first relay node is a target relay node;

in response to determining that the first relay node is the target relay node, transmitting the first blockchain message to the target blockchain node connected to the first relay node; and in response to identifying that the first relay node is different from the target relay node, transmitting the first blockchain message to the target relay node for the target relay node to forward the first blockchain message to the target blockchain node.

9. The non-transitory, computer-readable medium according to claim 8, wherein the first blockchain message comprises a set identifier of the target blockchain node set, and wherein determining the information of the first blockchain node, the primary routing table, and the secondary routing table includes operations comprising:
determining one of the plurality of blockchain nodes as the target blockchain node; and
determining a relay node connected to the one of the plurality of blockchain nodes as the target relay node.

10. The non-transitory, computer-readable medium according to claim 8, wherein the first blockchain message comprises a node identifier of the target blockchain node, and wherein determining the information of the first blockchain node, the primary routing table, and the secondary routing table includes operations comprising:
determining one of the plurality of blockchain nodes as the target blockchain node; and
determining a relay node connected to the one of the plurality of blockchain nodes as the target relay node.

11. The non-transitory, computer-readable medium according to claim 8, wherein the registration request comprises role type information, wherein the routing policy corresponding to each of the plurality of blockchain nodes comprises a role type corresponding to each blockchain node in the blockchain node set, wherein determining the information of the first blockchain node, the primary routing table, and the secondary routing table includes operations comprising:
determining, in response to the first blockchain message comprising a set identifier of the target blockchain node set, a blockchain node comprised in the target blockchain node set and corresponding to a target role type indicated in the first blockchain message in the information of the first blockchain node, the primary routing table, and the secondary routing table;
determining one of the plurality of blockchain nodes as the target blockchain node; and
determining a relay node connected to the one of the plurality of blockchain nodes as the target relay node.

12. The non-transitory, computer-readable medium according to claim 8, including operations comprising:

receiving, by the first relay node in the relay node set from a second relay node in a different relay node set, a second blockchain message sent for the target blockchain node in the target blockchain node set;

determining, from the information of the first blockchain node and the primary routing table, that the target blockchain node is connected to the first relay node; and forwarding, through the first relay node, the second blockchain message to the target blockchain node.

13. The non-transitory, computer-readable medium according to claim 8, wherein transmitting the first blockchain message to the target relay node includes operations comprising:

transmitting, in response to determining that the target relay node and the first relay node are comprised in a same relay node set, the first blockchain message to the target relay node; and transmitting, in response to determining that the target relay node and the first relay node are comprised in different relay node set, the first blockchain message to a host node in a relay node set that comprises the target relay node for the host node to forward the first blockchain message to the target relay node.

14. The non-transitory, computer-readable medium according to claim 8, wherein registering each of a plurality of blockchain nodes in a blockchain relay communication network to a blockchain node set indicated in a registration request includes operations comprising:

registering, in response to determining that the registration request comprises a set identifier, the corresponding blockchain node submitting the registration request to a blockchain node set corresponding to the set identifier; or registering, in response to determining that the registration request is absent of a set identifier, the corresponding blockchain node submitting the registration request to a default blockchain node set.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
registering each of a plurality of blockchain nodes in a blockchain relay communication network to a blockchain node set indicated in a registration request submitted by a corresponding blockchain node of the plurality of blockchain nodes;
generating a routing policy corresponding to each of the plurality of blockchain nodes, the routing policy comprising the blockchain node set that comprises the plurality of blockchain nodes and a relay node that connects to the corresponding blockchain node of the plurality of blockchain nodes;
receiving a first blockchain message sent for a target blockchain node in a target blockchain node set from one of the plurality of blockchain nodes;
determining information of a first blockchain node of the plurality of blockchain nodes connected to a first relay node, a primary routing table, and a secondary routing table, wherein the primary routing table is configured to record routing policies corresponding to the plurality of blockchain nodes connected to relay nodes in a relay node set that includes the first relay node, and the secondary routing table is configured to record one of (i) routing policies corresponding to the plurality of blockchain nodes connected to all relay nodes in the blockchain relay communication network or (ii) routing policies corresponding to the plurality of blockchain nodes connected to relay nodes in the blockchain relay communication network outside of the relay node set;
determining whether the first relay node is a target relay node;
in response to determining that the first relay node is the target relay node, transmitting the first blockchain message to the target blockchain node connected to the first relay node; and
in response to identifying that the first relay node is different from the target relay node, transmitting the first blockchain message to the target relay node for the target relay node to forward the first blockchain message to the target blockchain node.

16. The computer-implemented system of claim 15, wherein the first blockchain message comprises a set identifier of the target blockchain node set, and
wherein determining the information of the first blockchain node, the primary routing table, and the secondary routing table includes one or more operations comprising:
determining one of the plurality of blockchain nodes as the target blockchain node; and
determining a relay node connected to the one of the plurality of blockchain nodes as the target relay node.

17. The computer-implemented system of claim 15, wherein the first blockchain message comprises a node identifier of the target blockchain node, and
wherein determining the information of the first blockchain node, the primary routing table, and the secondary routing table includes one or more operations comprising:
determining one of the plurality of blockchain nodes as the target blockchain node; and
determining a relay node connected to the one of the plurality of blockchain nodes as the target relay node.

18. The computer-implemented system of claim 15, wherein the registration request comprises role type information,
wherein the routing policy corresponding to each of the plurality of blockchain nodes comprises a role type corresponding to each blockchain node in the blockchain node set,
wherein determining the information of the first blockchain node, the primary routing table, and the secondary routing table includes one or more operations comprising:
determining, in response to the first blockchain message comprising a set identifier of the target blockchain node set, a blockchain node comprised in the target blockchain node set and corresponding to a target role type indicated in the first blockchain message in the information of the first blockchain node, the primary routing table, and the secondary routing table;
determining one of the plurality of blockchain nodes as the target blockchain node; and
determining a relay node connected to the one of the plurality of blockchain nodes as the target relay node.

19. The computer-implemented system, according to claim 15, including one or more operations comprising:
receiving, by the first relay node in the relay node set from a second relay node in a different relay node set, a second blockchain message sent for the target blockchain node in the target blockchain node set;
determining, from the information of the first blockchain node and the primary routing table, that the target blockchain node is connected to the first relay node; and
forwarding, through the first relay node, the second blockchain message to the target blockchain node.

20. The computer-implemented system according to claim 15, wherein transmitting the first blockchain message to the target relay node includes one or more operations comprising:
transmitting, in response to determining that the target relay node and the first relay node are comprised in a same relay node set, the first blockchain message to the target relay node; and
transmitting, in response to determining that the target relay node and the first relay node are comprised in different relay node set, the first blockchain message to a host node in a relay node set that comprises the target relay node for the host node to forward the first blockchain message to the target relay node.

* * * * *